United States Patent
Rike

(10) Patent No.: US 7,050,690 B1
(45) Date of Patent: May 23, 2006

(54) PROCESSING PHOTOREACTIVE MATERIALS WITH OPEN OPTICAL WAVEGUIDES

(75) Inventor: Roy L. Rike, 36 Long Cove Rd., St. George, ME (US) 04860

(73) Assignee: Roy L. Rike, S. Thomaston, ME (US)

( * ) Notice: Subject to any disclaimer, the term of this patent is extended or adjusted under 35 U.S.C. 154(b) by 0 days.

(21) Appl. No.: 11/012,678

(22) Filed: Dec. 15, 2004

Related U.S. Application Data

(60) Provisional application No. 60/530,882, filed on Dec. 17, 2003.

(51) Int. Cl.
*G02B 6/10* (2006.01)

(52) U.S. Cl. ..................................................... 385/129
(58) Field of Classification Search .................. None
See application file for complete search history.

(56) References Cited

U.S. PATENT DOCUMENTS 5,247,268 A * 9/1993 Meise .......................... 333/111
5,515,464 A * 5/1996 Sheem ......................... 385/49
6,246,825 B1 * 6/2001 Kershaw ...................... 385/132

* cited by examiner

*Primary Examiner*—Michelle Connelly-Cushwa
*Assistant Examiner*—Chris Chu

(57) ABSTRACT

A method of using open optical waveguides to process photoreactive materials, particularly micro-nanoscale polymer thin films and chains. The illustrative embodiment shows a block (10) etched with a series of depressions to function as waveguides (14, 18), light source holders (22), a material-containing channel (12), and fluid input/overflow receptacles (24, 26). The waveguides and channel form a network constructed in conformity with a hexagonal grid pattern. A hinged waveguide cover (28) is attached to the block. Material is placed in the channel, a photoreactive solution, usually an azobenzene dye, added to the channel, the cover closed, and the light sources activated in different combinations and for different durations. The material is thereby altered through accepting surface accumulations of dye or by undergoing intrinsic structural change.

1 Claim, 1 Drawing Sheet

US 7,050,690 B1

PROCESSING PHOTOREACTIVE MATERIALS WITH OPEN OPTICAL WAVEGUIDES

CROSS REFERENCE TO RELATED APPLICATIONS

This application is entitled to the benefit of Provisional Patent Application Ser. No. 60/530,882 filed 2003 Dec. 17.

FEDERALLY SPONSORED RESEARCH

Not Applicable

SEQUENCE LISTING OR PROGRAM

Not Applicable

BACKGROUND OF THE INVENTION—FIELD OF THE INVENTION

This invention relates to optical waveguides, specifically as such waveguides are used to alter and combine photoreactive materials in a channel.

BACKGROUND OF THE INVENTION

There has been strong interest in developing practical methods for processing and manufacturing micro-nanoscale materials and components. This appears, for example, in the application of soft lithography to the construction of integrated circuits. Photoreactive materials have also received great attention in this respect, the comprehensive work on this topic being *Photoreactive Organic Thin Films*, edited by Z. Sekkat and W. Knoll (San Diego, 2002).

Existing methods of optically manipulating photoreactive materials in the micro-nanoscale range depend upon the complicated and expensive instruments developed for nearfield optical microscopy. Commercial exploitation of photoreactive materials depends however upon using simpler, more practical processing methods. One key model for the successful exploitation of nanoscale optical processing lies in the historical development of photography. With photography for comparison, the search arises for an equivalent to the camera in this new sector of photoprocessing now focused upon such materials as polymer thin films and chains.

BACKGROUND OF THE INVENTION—OBJECTS AND ADVANTAGES

The method described in my patent constructs optical instruments that are the commercial equivalent to the traditional photographic camera, employing networks of open (meaning hollow) optical waveguides to process photoreactive materials placed within chemically filled channels. Existing patents covering optical waveguides center on circuitry and telecommunication. Material processing applications are not evident. Patents covering open optical waveguides, the simplest type to manufacture, are rare (see U.S. patents: U.S. Pat. No. 4,684,206 to Bednorz et al. (1987); U.S. Pat. No. 4,789,214 to Vilhemsson et al. (1988); and U.S. Pat. No. 6,807,353 to Fleming et al. (2004)). There is no indication in prior art of an interest in constructing optical instruments for materials processing based upon open waveguides.

The first offically submitted record of concept for a method of combining open optical waveguides with a chemical-containing channel appears in my Provisional Patent Application (PPA) filed on Dec. 17, 2003, entitled "Multi-Use Photonic Planar Network System," Ser. No. 60/530,882. Materials processing occurs as a second embodiment, page 2: "This invention relates to photonic processing in two aspects: 1) data processing, and 2) materials processing." The present Regular patent application is an elaboration of the PPA: light sources attached to a planar optical waveguide network transmit outputs to photoreactive material.

Use of a hexagonal grid pattern facilitates the standardization and construction of the waveguide/channel network. The hex grid standardizes the angles of incidence of the light beams at 60 degrees (see Figures page, PPA). Insofar as a simple mechanism of adding/subtracting the intensity of one light beam to/from another light beam underlies the functioning of the network, use of a single such angle of incidence is possible and indeed advantageous for manufacturing. Such an optical architecture can provide a versatile, general purpose foundation for optical instruments capable of producing micro-nanoscale structures at low expense in several applications (for example, optical recording and the construction of artificial neural networks).

The following is a summary of the objects and advantages:
  (a) to provide a simple process for altering microscale and nanoscale photoreactive materials;
  (b) to provide a new foundation for constructing optical instruments;
  (c) to provide a new method of optical recording;
  (d) to provide a new method of constructing artificial neural networks.

SUMMARY

In accordance with the present invention a method employing open optical waveguides to process photoreactive materials.

DRAWINGS—FIGURES

Figure 1:
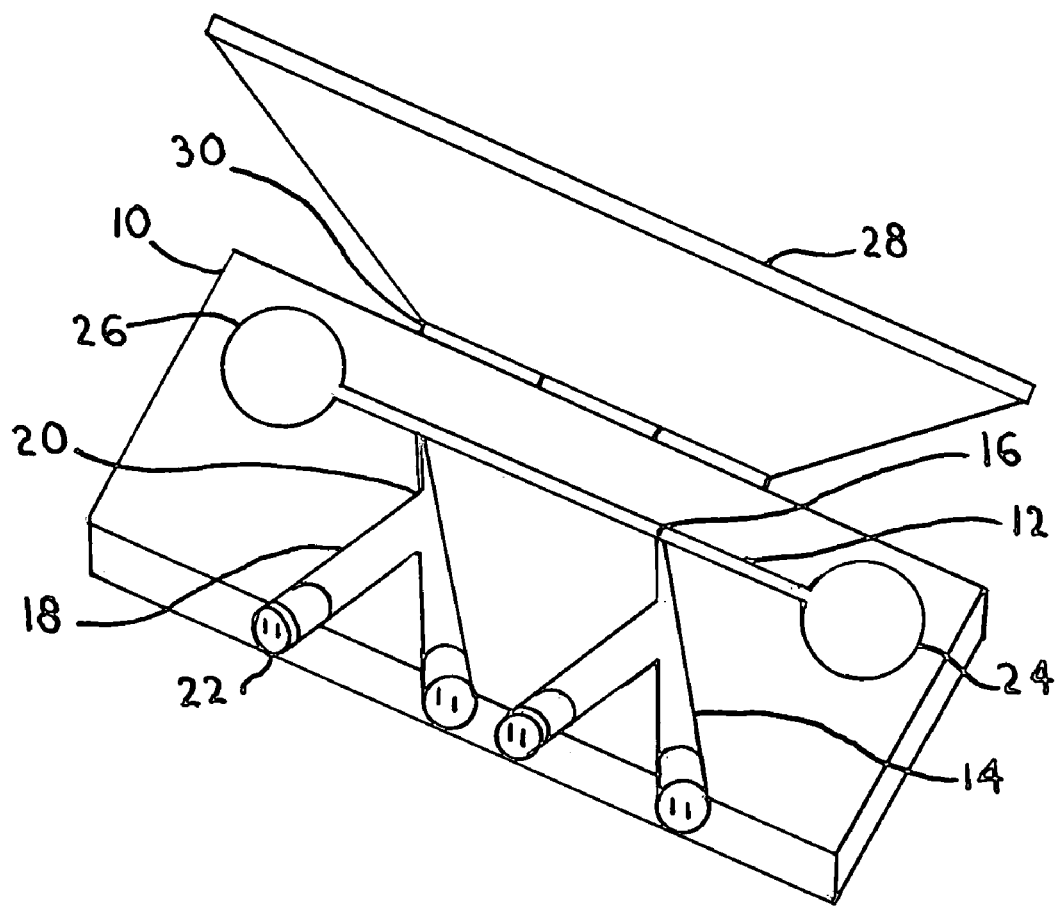
FIG. 1 shows an illustrative optical instrument constructed by the method.

| DRAWINGS-Reference Numerals | |
|---|---|
| 10 block | 12 material-containing channel |
| 14 channel input waveguide | 16 aperture into channel |
| 18 branch waveguide | 20 aperture into channel waveguide |
| 22 light source | 24 fluid input receptacle |
| 26 fluid overflow receptacle | 28 cover |
| 30 hinge | |

DETAILED DESCRIPTION—FIGS. 1 AND 2—ILLUSTRATIVE EMBODIMENT

Figure 2:
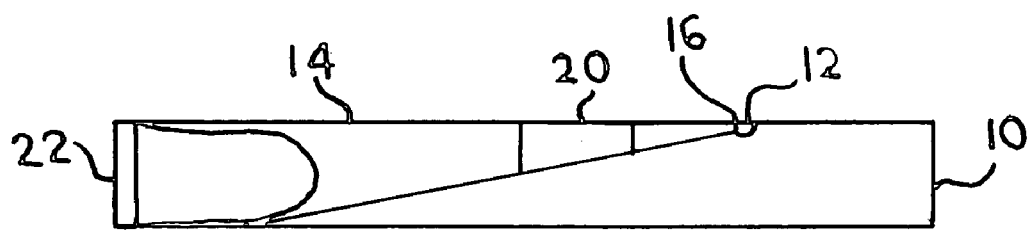
FIG. 2 shows a longitudinal section of a channel input waveguide.

An illustrative embodiment of the method described in the application is illustrated in FIG. 1 (overall view) and FIG. 2 (longitudinal section of waveguide). Depressions of different shapes are etched on a block 10. The etching instrument will usually be a laser and the block usually made of a predetermined plastic. The depressions perform different functions: as open optical waveguides 14, 18; light source holders (here, holding light emitting diodes) 22; a material-containing channel 12; and two fluid input/overflow receptacles 24, 26. A hinged waveguide cover 28 is attached to the top of the block on the edge opposite the light sources.

The device is constructed in the following steps:

1) Dimensions of the material-containing channel 12 are determined to suit those of the piece of material to be processed, usually a polymer film or chain. The channel is made sufficiently wide to contain the piece of material and permit the flow of processing chemical, usually a photoreactive azobenzene dye, around the material.
2) Dimensions are determined for the channel input fluid receptacle 24 and the channel output fluid receptacle 26 based on the amount of chemical to be used in the channel.
3) Light sources are chosen 22, usually light emitting diodes. The dimensions of a light source determine the width of its waveguide 14, 18. Light source dimensions also control the space available for waveguides on the surface of the block 10.
4) The number of waveguide apertures opening into the channel 12 is determined (on this device, two). These are the sites of optical processing in the channel. FIG. 1 shows two apertures 16 opening into the channel.
5) The number of branch waveguides 18 (these may not be required) attached to each channel input waveguide 14 is determined. FIG. 1 shows one branch waveguide attached to each channel waveguide.
6) An application specific hexagonal-based grid pattern is determined for the combination of the waveguides and channel into a planar network (see Figures page, PPA). The size of the unit-hexagon is determined by the following factors: the number of waveguides to be fitted on a specific block, the dimensions of the light sources, and the needed intervals for apertures (processing sites) along the length of the channel.
7) Waveguide 14, 18 dimensions are determined. Unless the light source is itself micrometer or nanometer-sized, the waveguide in which it is mounted will usually taper downward to the aperture, more so if it is a channel input waveguide. Branch waveguides do not join the processing channel 12 and therefore only require sufficient taper to meet the taper of the channel input waveguides they join. FIGS. 1 and 2 show the different degrees of taper in the two types of waveguides. Waveguide taper will also be affected by the distance of a light source from its aperture. In the case of the illustrative embodiment, this distance has been determined by selecting a location for the light sources at the edge of the block 10.
8) The dimensions of the finished planar network design, combining channel, fluid receptacles, light sources, and waveguides are programmed into an etching machine and etched on the block. Here, the light sources are mounted and electrically connected along the edge of the block, leaving the upper surface of the block entirely flat FIG. 2. At this stage, the tops of the waveguides are open (U-shaped in section) and not covered by the lid 28.
9) A hinged waveguide cover 28, 30 is fitted to the block. The cover is shaped so that when closed it will cover the waveguides (forming their top reflecting surfaces) 14, 18 and channel 12 but leave the fluid input/overflow receptacles 24, 26 uncovered.

OPERATION—FIGS. 1 And 2

Material to be processed is placed in the channel 12. The edge of the block holding the light sources 22 is raised slightly and the processing solution, usually a photoreactive azobenzene dye, is added to the input receptacle 24. When the solution has immersed the material, the waveguide cover 28 is closed and the light sources 22 turned on in a predetermined combination and for a predetermined length of time. When the exposure of the material is complete, the cover is raised and the material removed from the channel.

ADVANTAGES

From the description above, the advantages of my method of using open optical waveguides to process material are evident in the method's simplicity, economy, and adaptability. Optical instruments constructed by this method are better approximations of tools of mass production than the instruments originating in the field of nearfield microscopy.

CONCLUSION, RAMIFICATIONS, AND SCOPE

The reader will see that the method of using open optical waveguides described above can provide a practical, economic method of processing mateials, particularly micro-nanoscale photoreactive polymer thin films and chains. The simplicity of the method recommends its application to widescale manufacturing in a number of important applications such as optical recording and the development of artificial neural networks. The hexagon-based network of waveguides and channels can be constructed in a variety of configurations to produce different effects upon and in materials.

The illustrative emdodiment described in this application is an optical instrument used to show the principles of the method which I have invented and should not be construed as limiting the scope of the method. The scope of the method should be determined by the appended claims and their legal equivalents rather than by the example given.

I claim:

1. A method of employing open optical waveguides to process photoreactive materials, comprising:
   (a) connecting said waveguides to said materials-containing processing channels in conformity with a hexagonal grid pattern,
   whereby networks combining the waveguides and the channels may be easily standardized and constructed in order to facilitate the processing of the materials at small scales ranging from microscale to nanoscale with simple machinery.

* * * * *